US009639373B2

(12) United States Patent
Watanabe

(10) Patent No.: US 9,639,373 B2
(45) Date of Patent: May 2, 2017

(54) RECONFIGURABLE EMBEDDED DEVICE, METHOD OF RECONFIGURING AN EMBEDDED DEVICE AND NON-TRANSITORY RECORDING MEDIUM THEREFOR

(71) Applicant: Kenichi Watanabe, Kanagawa (JP)

(72) Inventor: Kenichi Watanabe, Kanagawa (JP)

(73) Assignee: RICOH COMPANY, LTD., Toyko (JP)

( * ) Notice: Subject to any disclaimer, the term of this patent is extended or adjusted under 35 U.S.C. 154(b) by 0 days.

(21) Appl. No.: 14/806,714

(22) Filed: Jul. 23, 2015

(65) Prior Publication Data
US 2016/0077839 A1 Mar. 17, 2016

(30) Foreign Application Priority Data
Sep. 16, 2014 (JP) ................................. 2014-187954

(51) Int. Cl.
| G06F 9/00 | (2006.01) |
| G06F 9/24 | (2006.01) |
| G06F 13/00 | (2006.01) |
| G06F 9/44 | (2006.01) |
| G06F 9/445 | (2006.01) |

(52) U.S. Cl.
CPC .............. *G06F 9/4401* (2013.01); *G06F 8/65* (2013.01); *G06F 9/445* (2013.01)

(58) Field of Classification Search
CPC .................................................. G06F 9/4401
USPC ............................................................ 713/2
See application file for complete search history.

(56) References Cited

U.S. PATENT DOCUMENTS

| 6,754,818 B1* | 6/2004 | Lee ....................... G06F 9/4406 713/1 |
| 7,761,682 B2* | 7/2010 | Barnum .............. G06F 13/1642 711/167 |
| 2005/0278561 A1* | 12/2005 | Seo ........................... G06F 1/32 713/322 |
| 2013/0250644 A1 | 9/2013 | Watanabe | |

FOREIGN PATENT DOCUMENTS

| JP | 03035474 A * | 2/1991 |
| JP | 2004-152068 | 5/2004 |
| JP | 2005-259064 | 9/2005 |

* cited by examiner

Primary Examiner — Suresh Suryawanshi
(74) Attorney, Agent, or Firm — Harness, Dickey & Pierce, P.L.C.

(57) ABSTRACT

An information processing apparatus providing a specific function includes a non-volatile function program memory that stores a function program for providing the specific function, a main memory, and an arithmetic device that reads and stores the function program from the function program memory into the main memory at startup of the information processing apparatus and performs an arithmetic operation based on the function program to execute the function program. The arithmetic device operates at a start frequency set for startup as a clock frequency for accessing the function program memory when reading and storing the function program from the function program memory into the main memory at the startup, and operates at a frequency lower than the start frequency as the clock frequency for accessing the function program memory after reading and storing the function program into the main memory.

11 Claims, 4 Drawing Sheets

RECONFIGURABLE EMBEDDED DEVICE, METHOD OF RECONFIGURING AN EMBEDDED DEVICE AND NON-TRANSITORY RECORDING MEDIUM THEREFOR

CROSS-REFERENCE TO RELATED APPLICATION

This patent application is based on and claims priority pursuant to 35 U.S.C. §119(a) to Japanese Patent Application No. 2014-187954 on Sep. 16, 2014, in the Japan Patent Office, the entire disclosure of which is hereby incorporated by reference herein.

BACKGROUND

Technical Field

This disclosure relates to an information processing apparatus, an information processing method, and a non-transitory recording medium.

Related Art

An embedded device that provides a specific function, such as industrial equipment, communication equipment, home equipment, audio/visual (AV) equipment, transport equipment, or medical equipment, has been widely used in recent years.

Examples of such an embedded device include a printer, a scanner, a copier, a facsimile machine, a multifunction peripheral, a projector, a digital home electric appliance, a navigation system, a game machine, a smartphone, a tablet, a personal digital assistant (PDA), an industrial robot, and an automated external defibrillator (AED).

The embedded device is normally configured to provide a specific function unlike a general-purpose information processing apparatus, such as a personal computer (PC), for example, which provides various functions based on applications installed thereon as desired.

SUMMARY

In one embodiment of this disclosure, there is provided an improved information processing apparatus that provides a specific function and includes, for example, a non-volatile function program memory, a main memory, and an arithmetic device. The non-volatile function program memory stores a function program for providing the specific function. The arithmetic device reads and stores the function program from the non-volatile function program memory into the main memory at startup of the information processing apparatus and performs an arithmetic operation based on the function program to execute the function program. When reading and storing the function program from the non-volatile function program memory into the main memory at the startup, the arithmetic device operates at a start frequency set for startup as a clock frequency for accessing the non-volatile function program memory. After reading and storing the function program from the non-volatile function program memory into the main memory, the arithmetic device operates at a frequency lower than the start frequency as the clock frequency for accessing the non-volatile function program memory.

In one embodiment of this disclosure, there is provided an improved information processing method performed by an information processing apparatus. The information processing method includes, in one example, storing a function program for providing a specific function in a non-volatile function program memory; reading and storing the function program from the non-volatile function program memory into a main memory of the information processing apparatus at startup of the information processing apparatus; and performing an arithmetic operation based on the function program to execute the function program. The reading and storing the function program includes setting a clock frequency for accessing the non-volatile function program memory to a start frequency for startup before the reading and storing the function program, and reducing the clock frequency for accessing the non-volatile function program memory to a frequency lower than the start frequency after the reading and storing the function program.

In one embodiment of this disclosure, there is provided a non-transitory recording medium storing a program for causing an information processing apparatus to execute information processing including the above-described steps.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
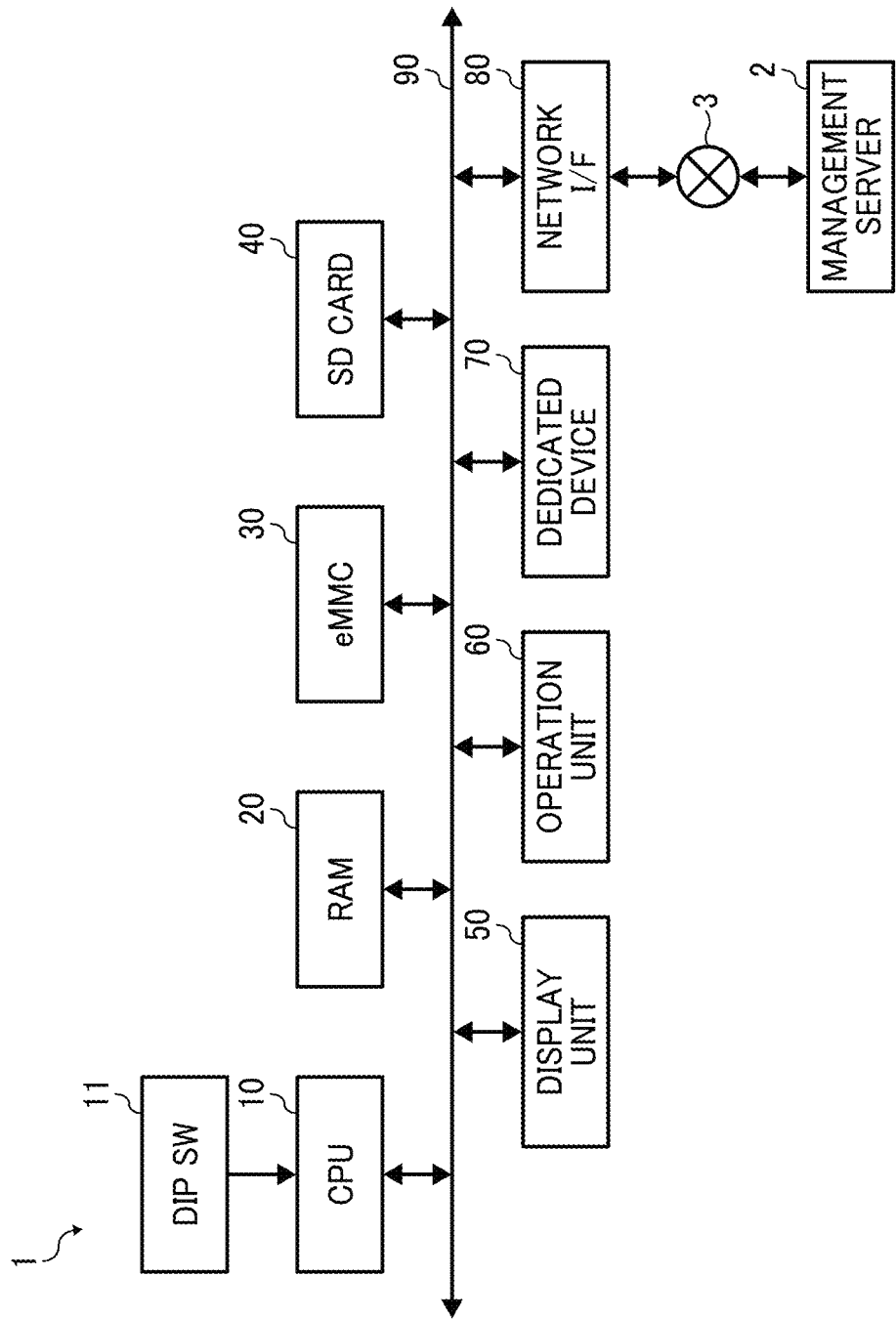
FIG. 1 is a schematic block diagram illustrating a hardware configuration of an embedded device according to an embodiment of this disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, an embodiment of this disclosure will be described in detail. In an example described below, an information processing apparatus according to the embodiment is an embedded device that provides a specific function, such as industrial equipment, communication equipment, home equipment, audio/visual (AV) equipment, transport equipment, or medical equipment.

Such an embedded device may be a printer, a scanner, a copier, a facsimile machine, a multifunction peripheral, a projector, a digital home electric appliance, a navigation system, a game machine, a smartphone, a tablet, a personal digital assistant (PDA), an industrial robot, or an automated external defibrillator (AED), for example.

In the embedded device, an arithmetic device, such as a central processing unit (CPU) or a micro processing unit (MPU), deploys all of a boot program for starting the embedded device and an application program for providing a function from an external memory, such as an embedded multi-media card (eMMC), a hard disc drive (HDD), a solid state drive (SSD), or a secure digital (SD) card, to a random access memory (RAM) at startup, and performs an arithmetic operation in accordance with the programs deployed to the RAM, i.e., performs so-called RAM execution. That is, the application program serves as a function program in the present embodiment.

After the deployment of the programs to the RAM, the arithmetic device simply writes and reads data such as setting values to and from the external memory.

To reduce the startup time of the embedded device in response to recent requests therefor, it is desirable to increase the clock frequency in data transfer between the arithmetic device and the external memory to increase the speed of data transfer therebetween during the deployment of the programs to the RAM. In fact, the clock frequency in the data transfer between the arithmetic device and the external memory has been increased in recent years. For example, the clock frequency has been increased from 52 MHz to 200 MHz in the data transfer between the CPU and the eMMC.

In the above-described embedded device, however, a single-ended clock signal is used in the access between the CPU and the external memory, particularly when the external memory is an eMMC or an SD card. With the increase of the clock frequency, therefore, electromagnetic interference (EMI) noise is generated.

Consequently, if the clock frequency remains high after the deployment of the programs to the RAM, i.e., when a high data transfer speed is not desired as much as during the deployment of the programs to the RAM, the EMI noise may persist in the embedded device.

If the processing load is low and the clock frequency is set to a low level, the EMI noise is reduced. If the clock frequency is fixed to the low level to reduce the EMI noise occurring after the deployment of the programs to the RAM, however, the data transfer speed during the deployment of the programs to the RAM is reduced, extending the startup time.

In the embedded device, there is thus a trade-off between the increase of the data transfer speed and the reduction of the EMI noise, with one thereof compromised for the sake of the other.

Accordingly, the embedded device according to the present embodiment increases the clock frequency during the deployment of a program to the RAM to increase the data transfer speed between the arithmetic device and the external memory, and reduces the clock frequency after the deployment of the program to the RAM, i.e., when it is unnecessary to maintain the increased data transfer speed, to suppress the EMI noise. With this configuration, the embedded device according to the present embodiment attains both the increase of the data transfer speed between the arithmetic device and the external memory and the reduction of the EMI noise.

In an embedded device, the EMI noise is not normally measured during a transitional period, such as a power-up period, in which the program deployment to the RAM takes place. It is thus unnecessary to take into account the EMI noise due to the increase of the clock frequency during the program deployment to the RAM. The present embodiment, therefore, addresses the reduction of the EMI noise after the program deployment to the RAM.

A hardware configuration of an embedded device 1 according to the present embodiment will now be described with reference to FIG. 1. FIG. 1 is a schematic block diagram illustrating a hardware configuration of the embedded device 1 according to the present embodiment.

As illustrated in FIG. 1, the embedded device 1 according to the present embodiment includes a CPU 10, a dual in-line package switch (DIP SW) 11, a RAM 20, an eMMC 30, an SD card 40, a display unit 50, an operation unit 60, a dedicated device 70, and a network interface (I/F) 80 connected to one another via a bus 90. The network I/F 80 is further connected to a management server 2 via a network 3.

The CPU 10 is an arithmetic device that controls an overall operation of the embedded device 1. Further, at startup of the embedded device 1, the CPU 10 selects one of the eMMC 30 and the SD card 40 as a source from which a boot program and an application program are booted in accordance with the status of the DIP SW 11. More specifically, the DIP SW 11 switches between the eMMC 30 and the SD card 40 at the startup, allowing the CPU 10 to select the read source in accordance with the status of the DIP SW 11. That is, the DIP SW 11 serves as a read source selection unit in the present embodiment.

Specifically, if the DIP SW 11 is off, the CPU 10 deploys the boot program and the application program stored in the eMMC 30 to the RAM 20 to start the embedded device 1. If the DIP SW 11 is on, the CPU 10 deploys the boot program and the application program stored in the SD card 40 to the RAM 20 to start the embedded device 1.

Further, the CPU 10 includes therein a mask read-only memory (ROM) that stores a start program. With the start program, the CPU 10 communicates with the eMMC 30 or the SD card 40 to establish the access mode of the communication.

Herein, the access mode refers to the mode in which the CPU 10 accesses the eMMC 30 or the SD card 40. In the present embodiment, the CPU 10 accesses the eMMC 30 in an HS200 mode or a DDR52 mode, and accesses the SD card 40 in an SDR104 mode or an SDR12 mode. The CPU 10 accesses the eMMC 30 at a clock frequency of 200 MHz in the HS200 mode, and at a clock frequency of 52 MHz in the DDR52 mode. Further, the CPU 10 accesses the SD card 40 at 200 MHz in the SDR104 mode, and at 25 MHz in the SDR12 mode.

The RAM 20 is a volatile memory on which information is read and written at high speed, and which serves as a main memory used as a work area for the CPU 10 in processing information. The eMMC 30 is a non-volatile memory on which information is read and written, and which stores the boot program and the application program. That is, the eMMC 30 serves as a function program memory in the present embodiment.

The SD card 40 is a removable non-volatile memory having an interface compatible with an interface of the eMMC 30, and is connected to the embedded device 1 as necessary. As described above, the eMMC 30 stores the boot program and the application program. If there is an update program for fixing a bug in these programs or adding a new function to the programs, the update program is stored in the SD card 40 and provided to a user of the embedded device 1. That is, the SD card 40 serves as an update program memory in the present embodiment.

In addition to the application program for providing a standard function, an optional application program for expanding the standard function (hereinafter referred to as the optional program) may be prepared for the embedded device 1. Such an optional program is stored in the SD card 40 and provided to the user of the embedded device 1. That is, the optional program and the SD card 40 serve as an expansion program and an expansion program memory, respectively, in the present embodiment.

Further, the SD card 40 may store the boot program and the application program to boot the embedded device 1 from the SD card 40. That is, in the present embodiment, the SD card 40 serves as a non-volatile memory provided separately from the function program memory.

The display unit 50 is a visual user interface for allowing the user to check the status of the embedded device 1, and may be implemented by a display device such as a liquid crystal display (LCD) or a light-emitting diode (LED). The operation unit 60 is a user interface for allowing the user to input information to the embedded device 1, and includes operation buttons, switches, and so forth.

The dedicated device 70 is hardware for providing a dedicated function to the embedded device 1. The network I/F 80 connects and controls the bus 90 and the network 3.

The management server 2 is a shared server accessible by the embedded device 1 via the network I/F 80 and the network 3, and stores the update program or the optional program. The embedded device 1 downloads the update program or the optional program from the management server 2 as necessary. That is, the management server 2 serves as an external memory in the present embodiment.

In the above-described hardware configuration, the CPU 10 deploys all of the boot program and the application program stored in the eMMC 30 to the RAM 20 at startup of the embedded device 1 and performs an arithmetic operation in accordance with the programs deployed to the RAM 20, i.e., performs the RAM execution. After the deployment of the programs to the RAM 20, the CPU 10 simply writes and reads data such as setting values to and from the eMMC 30.

In the embedded device 1, therefore, it is desirable to increase the data transfer speed between the CPU 10 and the eMMC 30 during the deployment of a program to the RAM 20 to reduce the processing time, and to give priority to the reduction of the EMI noise over the increase of the data transfer speed after the deployment of the program to the RAM 20, since the increase of the data transfer speed between the CPU 10 and the eMMC 30 after the program deployment to the RAM 20 does not contribute to the reduction of the processing time as much as during the program deployment to the RAM 20.

The embedded device 1 according to the present embodiment is therefore configured such that, during the deployment of a program to the RAM 20, the CPU 10 accesses the eMMC 30 in the HS200 mode for increasing the data transfer speed to reduce the processing time of the deployment, and that, after the deployment of the program to the RAM 20, the CPU 10 accesses the eMMC 30 in the DDR52 mode for suppressing the EMI noise to reduce the EMI noise. Accordingly, the embedded device 1 according to the present embodiment attains both the increase of the data transfer speed between the CPU 10 and the eMMC 30 and the reduction of the EMI noise.

Figure 2:
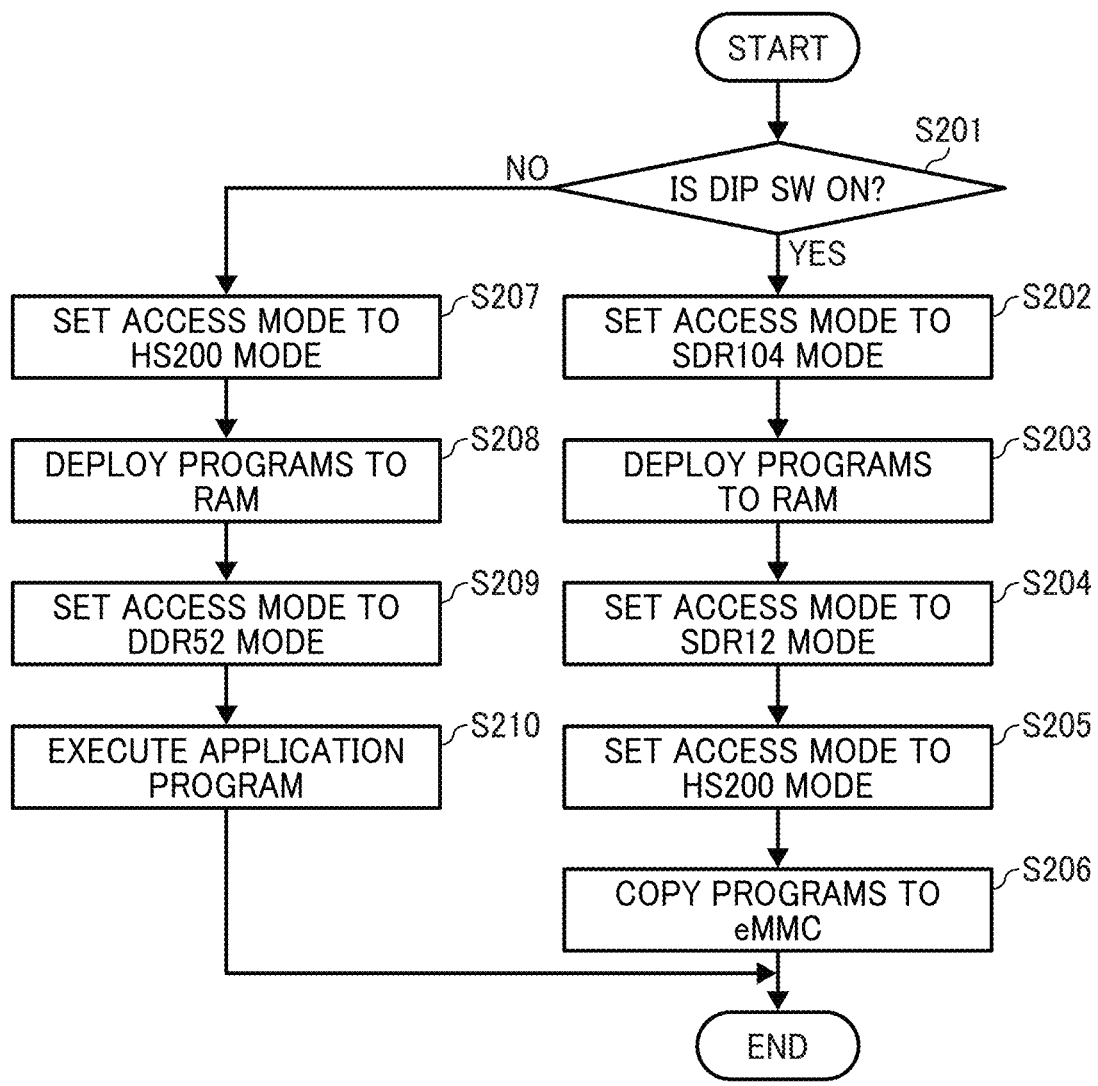
FIG. 2 is a flowchart illustrating a startup process of the embedded device according to the embodiment.

With reference to FIG. 2, a startup process of the embedded device 1 according to the present embodiment will now be described. FIG. 2 is a flowchart illustrating a startup process of the embedded device 1 according to the present embodiment.

As illustrated in FIG. 2, in the startup of the embedded device 1 according to the present embodiment, the CPU 10 first determines whether or not the DIP SW 11 is on (step S201). If having determined at step S201 that the DIP SW 11 is on (YES at step S201), the CPU 10 sets the access mode to the SD card 40 to the SDR104 mode (step S202).

The CPU 10 then deploys all of the boot program and the application program stored in the SD card 40 to the RAM 20 in the SDR104 mode (step S203). That is, in the present embodiment, when the embedded device 1 is booted from the SD card 40, the frequency in the SDR104 mode serves as a start frequency.

The embedded device 1 is thus booted from the SD card 40 when the boot program and the application program are not stored in the eMMC 30, i.e., in a manufacturing process of the embedded device 1.

As described above, the embedded device 1 is normally booted from the SD card 40 in a manufacturing factory of the embedded device 1, which is a condition or environment not subjected to EMI noise control. When the embedded device 1 is booted from the SD card 40, therefore, it is unnecessary to take into account the EMI noise even if the data transfer takes place at a high data transfer speed in the SDR104 mode. Accordingly, the productivity of the embedded device 1 and the eMMC 30 is improved in the present embodiment.

After having deployed all of the boot program and the application program to the RAM 20 from the SD card 40, the CPU 10 sets the access mode to the SD card 40 to the SDR12 mode (step S204). With the access mode to the SD card 40 thus set to the SDR12 mode after the deployment of the programs to the RAM 20 from the SD card 40, the EMI noise is reduced in the present embodiment.

The CPU 10 then sets the access mode to the eMMC 30 to the HS200 mode (step S205), and copies all of the boot program and the application program stored in the SD card 40 to the eMMC 30 in the HS200 mode (step S206). When the boot program and the application program stored in the SD card 40 are all copied to the eMMC 30, the startup process of the embedded device 1 according to the present embodiment is completed.

As described above, the embedded device 1 is normally booted from the SD card 40 in the manufacturing factory of the embedded device 1, which is a condition or environment not subjected to the EMI noise control. It is therefore unnecessary to take into account the EMI noise even if the data transfer takes place at a high data transfer speed in the HS200 mode. Accordingly, the productivity of the embedded device 1 and the eMMC 30 is improved in the present embodiment.

If having determined at step S201 that the DIP SW 11 is off (NO at step S201), the CPU 10 sets the access mode to the eMMC 30 to the HS200 mode (step S207).

The CPU 10 then deploys all of the boot program and the application program stored in the eMMC 30 to the RAM 20 in the HS200 mode (step S208). That is, in the present embodiment, when the embedded device 1 is booted from the eMMC 30, the frequency in the HS200 mode serves as the start frequency.

By thus accessing the eMMC 30 at a high data transfer speed in the HS200 mode during the deployment of the programs to the RAM 20 from the eMMC 30, the embedded device 1 according to the present embodiment is capable of reducing the processing time of the deployment. As described above, it is unnecessary to take into account the EMI noise during the startup, since the EMI noise is not normally measured during the startup.

After having deployed all of the boot program and the application program to the RAM 20 from the eMMC 30, the CPU 10 sets the access mode to the eMMC 30 to the DDR52 mode (step S209), and executes the application program in the DDR52 mode (step S210). Thereby, the startup process of the embedded device 1 according to the present embodiment is completed.

By thus accessing the eMMC 30 in the DDR52 mode for suppressing the EMI noise after having deployed the programs to the RAM 20 from the eMMC 30, the embedded device 1 according to the present embodiment is capable of reducing the EMI noise after the deployment of the programs to the RAM 20.

Figure 3:
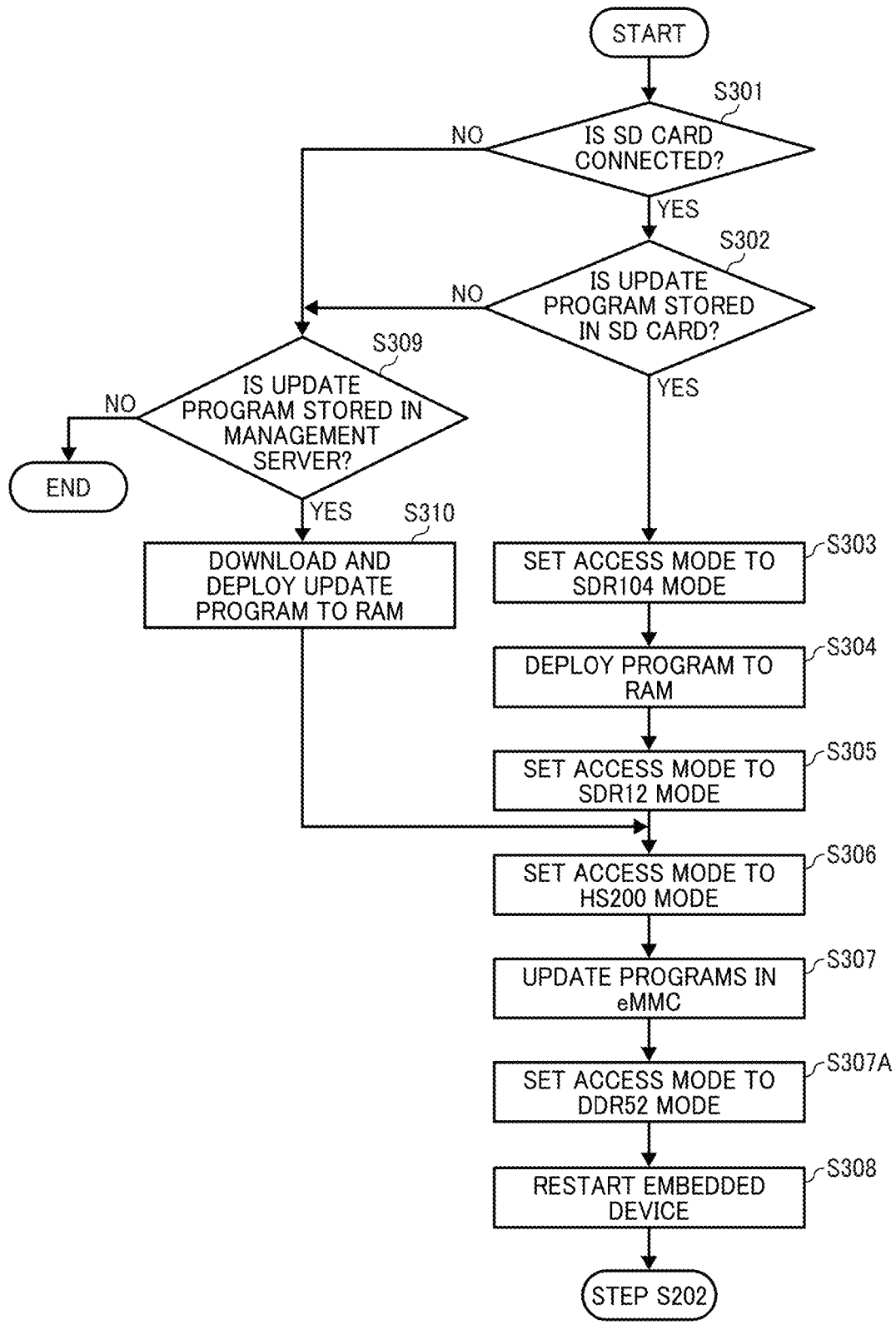
FIG. 3 is a flowchart illustrating a process of updating a program by the embedded device according to the embodiment.

With reference to FIG. 3, a description will now be given of a process of updating a program by the embedded device 1 according to the present embodiment. FIG. 3 is a flowchart illustrating a process of updating a program by the embedded device 1 according to the present embodiment. It is assumed in FIG. 3 that the embedded device 1 has already been started by the process described above with reference to FIG. 2, and that the update program is stored in the SD card 40 or the management server 2.

As illustrated in FIG. 3, when the embedded device 1 according to the present embodiment updates a program, the CPU 10 first determines whether or not the SD card 40 is connected to the embedded device 1 (step S301). If having determined at step S301 that the SD card 40 is connected to the embedded device 1 (YES at step S301), the CPU 10 determines whether or not the update program is stored in the SD card 40 (step S302).

If having determined at step S302 that the update program is stored in the SD card 40 (YES at step S302), the CPU 10 sets the access mode to the SD card 40 to the SDR104 mode (step S303). The CPU 10 then deploys all of the update program stored in the SD card 40 to the RAM 20 in the SDR104 mode (step S304). That is, the frequency in the SDR104 mode serves as an update frequency in the present embodiment.

By thus accessing the SD card 40 at a high data transfer speed in the SDR104 mode during the deployment of the program to the RAM 20 from the SD card 40, the embedded device 1 according to the present embodiment is capable of reducing the processing time of the deployment. Since the program update process takes place irregularly at a frequency of once a month or so, the EMI noise is not measured during the program update. It is therefore unnecessary to take into account the EMI noise during the program update.

After having deployed all of the update program to the RAM 20 from the SD card 40, the CPU 10 sets the access mode to the SD card 40 to the SDR12 mode (step S305). With the access mode to the SD card 40 thus set to the SDR12 mode after the deployment of the program to the RAM 20 from the SD card 40, the power consumption is reduced in the present embodiment.

The CPU 10 then sets the access mode to the eMMC 30 to the HS200 mode (step S306), and overwrites the eMMC 30 with the update program deployed to the RAM 20 in the HS200 mode to update the boot program and the application program stored in the eMMC 30 (step S307). That is, the frequency in the HS200 mode serves as an overwrite frequency in the present embodiment.

By thus accessing the eMMC 30 at a high data transfer speed in the HS200 mode when overwriting the eMMC 30 with the program in the RAM 20, the embedded device 1 according to the present embodiment is capable of reducing the processing time of the overwrite. As described above, the program update process takes place irregularly at a frequency of once a month or so. Therefore, the EMI noise is not measured during the program update, and it is unnecessary to take into account the EMI noise during the program update.

Then, the CPU 10 sets the access mode to the eMMC 30 to the DDR52 mode (step S307A). After the CPU 10 overwrites the eMMC 30 with all of the update program deployed to the RAM 20, the embedded device 1 according to the present embodiment is restarted (step S308) to proceed to the process of step S202. The embedded device 1 according to the present embodiment thereby executes the program update.

If having determined at step S301 that the SD card 40 is not connected to the embedded device 1 (NO at step S301), or if having determined at step S302 that the update program is not stored in the SD card 40 (NO at step S302), the CPU 10 determines whether or not the update program is stored in the management server 2 (step S309).

If the CPU 10 determines at step S309 that the update program is not stored in the management server 2 (NO at step S309), the program update process of the embedded device 1 according to the present embodiment is completed.

If the CPU 10 determines at step S309 that the update program is stored in the management server 2 (YES at step S309), the CPU 10 downloads and deploys the update program to the RAM 20 from the management server 2 (step S310). After having downloaded and deployed the update program to the RAM 20 from the management server 2, the CPU 10 performs processes similar to those of steps S306 to S308.

Figure 4:
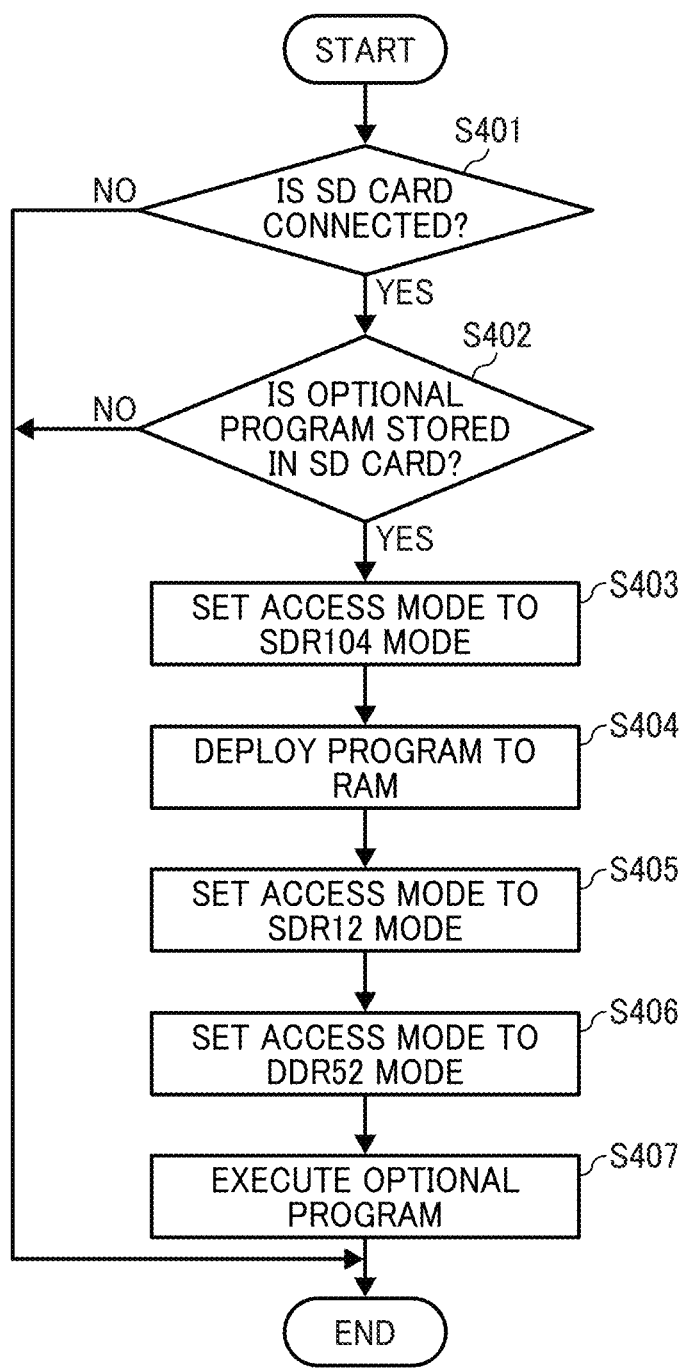
FIG. 4 is a flowchart illustrating a process of executing an optional program by the embedded device according to the embodiment.

With reference to FIG. 4, a description will now be given of a process of executing the optional program by the embedded device 1 according to the present embodiment. FIG. 4 is a flowchart illustrating a process of executing the optional program by the embedded device 1 according to the present embodiment. It is assumed in FIG. 4 that the embedded device 1 has already been started by the process described above with reference to FIG. 2, and that the optional program is stored in the SD card 40.

As illustrated in FIG. 4, when the embedded device 1 according to the present embodiment executes the optional program, the CPU 10 first determines whether or not the SD card 40 is connected to the embedded device 1 (step S401). If the CPU 10 determines at step S401 that the SD card 40 is not connected to the embedded device 1 (NO at step S401), the optional program execution process of the embedded device 1 according to the present embodiment is completed.

If having determined at step S401 that the SD card 40 is connected to the embedded device 1 (YES at step S401), the CPU 10 then determines whether or not the optional program is stored in the SD card 40 (step S402). If the CPU 10 determines at step S402 that the optional program is not stored in the SD card 40 (NO at step S402), the optional program execution process of the embedded device 1 according to the present embodiment is completed.

If having determined at step S402 that the optional program is stored in the SD card 40 (YES at step S402), the CPU 10 sets the access mode to the SD card 40 to the SDR104 mode (step S403). The CPU 10 then deploys all of the optional program stored in the SD card 40 to the RAM 20 in the SDR104 mode (step S404). That is, the frequency in the SDR104 mode serves as an execution frequency in the present embodiment.

By thus accessing the SD card 40 at a high data transfer speed in the SDR104 mode when deploying the program to the RAM 20 from the SD card 40, the embedded device 1 according to the present embodiment is capable of reducing the processing time of the deployment. As described above, the EMI noise in an embedded device is not normally measured during the transitional period, such as the power-up period, in which the program deployment to the RAM takes place. It is thus unnecessary to take into account the EMI noise due to the increase of the clock frequency during the program deployment to the RAM.

After having deployed all of the optional program stored in the SD card 40 to the RAM 20, the CPU 10 sets the access mode to the SD card 40 to the SDR12 mode (step S405). By thus setting the access mode to the SD card 40 to the SDR12 mode after the deployment of the program to the RAM 20 from the SD card 40, the EMI noise is reduced in the present embodiment.

The CPU 10 then sets the access mode to the eMMC 30 to the DDR52 mode (step S406), and executes the optional program in the DDR52 mode (step S407). Thereby, the optional program execution process of the embedded device 1 according to the present embodiment is completed.

By thus accessing the eMMC 30 in the DDR52 mode for suppressing the EMI noise after the deployment of the program to the RAM 20 from the SD card 40, the embedded device 1 according to the present embodiment is capable of reducing the EMI noise after the deployment of the program to the RAM 20.

In the foregoing example, the embedded device 1 according to the present embodiment is configured such that the CPU 10 deploys the boot program and the application program to the RAM 20 from an external memory such as an eMMC, an HDD, an SSD, or an SD memory. Alternatively, the embedded device 1 may include a non-volatile ROM connected to the bus 90 to allow the CPU 10 to deploy the programs to the RAM 20 from the ROM.

Further, in the foregoing example of the present embodiment, the optional program is stored in the SD card 40 and provided to the user to be executed from the SD card 40. Alternatively, the optional program may previously be stored in the eMMC 30 to be executed therefrom, or may be copied to the eMMC 30 from the SD card 40 to be executed from the eMMC 30 after the copying.

An embedded device according to an embodiment of this disclosure attains both the increase of the data transfer speed between the arithmetic device and the external memory and the reduction of the EMI noise.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing apparatus that provides a specific function, the information processing apparatus comprising:
 a non-volatile function program memory to store a function program for providing the specific function;
 a main memory;
 an arithmetic device to read and store the function program from the non-volatile function program memory into the main memory at startup of the information processing apparatus and perform an arithmetic operation based on the function program to execute the function program,
  wherein when reading and storing the function program from the non-volatile function program memory into the main memory at the startup, the arithmetic device operates at a start frequency set for startup as a clock frequency for accessing the non-volatile function program memory, and
  wherein after reading and storing the function program from the non-volatile function program memory into the main memory at the start-up, the arithmetic device operates at a frequency lower than the start frequency as the clock frequency for accessing the non-volatile function program memory;
 a non-volatile update program memory provided separately from the non-volatile function program memory to store an update program for updating the function program,
  wherein, when the non-volatile update program memory stores the update program, the arithmetic device reads and stores the update program from the non-volatile update program memory into the main memory and writes the update program over the function program stored in the non-volatile function program memory to update the function program,
  wherein when reading and storing the update program from the non-volatile update program memory into the main memory to update the function program, the arithmetic device operates at an update frequency set for update as a clock frequency for accessing the non-volatile update program memory, and
  wherein after reading and storing the update program from the non-volatile update program memory into the main memory, the arithmetic device operates at a frequency lower than the update frequency as the clock frequency for accessing the non-volatile update program memory; and
 an external memory storing the update program connected to the information processing apparatus via a network,
  wherein, when the external memory stores the update program, the arithmetic device downloads the update program from the external memory to the main memory and writes the update program over the function program stored in the non-volatile function program memory to update the function program.

2. The information processing apparatus of claim 1, further comprising:
 a non-volatile memory provided separately from the non-volatile function program memory to store the function program, and
 a read source selection unit that selects one of the non-volatile function program memory and the non-volatile memory as a read source from which the function program is read and stored into the main memory.

3. The information processing apparatus of claim 1, wherein when writing the update program from the non-volatile update program memory over the function program, the arithmetic device operates at an overwrite frequency set for overwrite as the clock frequency for accessing the non-volatile function program memory, and
 wherein after writing the update program from the non-volatile update program memory over the function program, the arithmetic device operates at a frequency lower than the overwrite frequency as the clock frequency for accessing the non-volatile function program memory.

4. The information processing apparatus of claim 1, further comprising:
 a non-volatile expansion program memory to store an expansion program for expanding the specific function provided by the function program,
 wherein the arithmetic device reads and stores the expansion program from the non-volatile expansion program memory into the main memory and performs an arithmetic operation based on the expansion program to execute the expansion program.

5. The information processing apparatus of claim 4, wherein when reading and storing the expansion program from the non-volatile expansion program memory into the main memory to execute the expansion program, the arithmetic device operates at an execution frequency set for execution as a clock frequency for accessing the non-volatile expansion program memory, and
 wherein after reading and storing the expansion program from the non-volatile expansion program memory into the main memory, the arithmetic device operates at a frequency lower than the execution frequency as the clock frequency for accessing the non-volatile expansion program memory.

6. An information processing method performed by an information processing apparatus, the information processing method comprising:
 storing a function program for providing a specific function in a non-volatile function program memory;
 reading and storing the function program from the non-volatile function program memory into a main memory of the information processing apparatus at startup of the information processing apparatus;
 performing an arithmetic operation based on the function program to execute the function program,
  wherein the reading and storing the function program includes
   setting a clock frequency for accessing the non-volatile function program memory to a start frequency for startup before the reading and storing the function program, and
   reducing the clock frequency for accessing the non-volatile function program memory to a frequency lower than the start frequency after the reading and storing the function program;
 storing an update program for updating the function program in a non-volatile update program memory provided separately from the non-volatile function program memory,
 reading and storing the update program from the non-volatile update program memory into the main memory and writing the update program over the function program when the update program is stored in the non-volatile function program memory to update the function program,
  wherein when reading and storing the update program from the non-volatile update program memory into the main memory to update the function program, setting an update frequency as a clock frequency for accessing the non-volatile update program memory, and wherein after reading and storing the update program from the non-volatile update program memory into the main memory, setting the clock frequency at a frequency lower than the update frequency for accessing the non-volatile update program memory; and storing the update program in an external memory connected to the information processing apparatus via a network, and, when the external memory stores the update program, downloading the update program from the external memory to the main memory and writing the update program over the function program stored in the non-volatile function program memory to update the function program.

7. The information processing method of claim 6, further comprising:

storing the function program in a non-volatile memory provided separately from the non-volatile function program memory; and selecting one of the non-volatile function program memory and the non-volatile memory as a read source from which the function program is read and stored into the main memory.

8. The information processing method of claim 6, wherein the writing the update program over the function program includes setting the clock frequency for accessing the non-volatile function program memory to an overwrite frequency for overwrite before the writing the update program over the function program, and reducing the clock frequency for accessing the non-volatile function program memory to a frequency lower than the overwrite frequency after the writing the update program over the function program.

9. The information processing method of claim 6, further comprising:

storing an expansion program for expanding the specific function of the function program in a non-volatile expansion program memory;

reading and storing the expansion program from the non-volatile expansion program memory into the main memory; and performing an arithmetic operation based on the expansion program to execute the expansion program.

10. The information processing method of claim 9, wherein the reading and storing the expansion program includes setting a clock frequency for accessing the non-volatile expansion program memory to an execution frequency for execution before the reading and storing the expansion program, and reducing the clock frequency for accessing the non-volatile expansion program memory to a frequency lower than the execution frequency after the reading and storing the expansion program.

11. A non-transitory recording medium storing a program for causing an information processing apparatus to execute information processing comprising:

storing a function program for providing a specific function in a non-volatile function program memory;

reading and storing the function program from the non-volatile function program memory into a main memory of the information processing apparatus at startup of the information processing apparatus;

performing an arithmetic operation based on the function program to execute the function program, wherein the reading and storing the function program includes setting a clock frequency for accessing the non-volatile function program memory to a start frequency for startup before the reading and storing the function program, and reducing the clock frequency for accessing the non-volatile function program memory to a frequency lower than the start frequency after the reading and storing the function program;

storing an update program for updating the function program in a non-volatile update program memory provided separately from the non-volatile function program memory, reading and storing the update program from the non-volatile update program memory into the main memory and writing the update program over the function program when the update program is stored in the non-volatile function program memory to update the function program, wherein when reading and storing the update program from the non-volatile update program memory into the main memory to update the function program, setting an update frequency as a clock frequency for accessing the non-volatile update program memory, and wherein after reading and storing the update program from the non-volatile update program memory into the main memory, setting the clock frequency at a frequency lower than the update frequency for accessing the non-volatile update program memory; and storing the update program in an external memory connected to the information processing apparatus via a network, and, when the external memory stores the update program, downloading the update program from the external memory to the main memory and writing the update program over the function program stored in the non-volatile function program memory to update the function program.

\* \* \* \* \*